(12) United States Patent
Merchant et al.

(10) Patent No.: US 9,103,254 B2
(45) Date of Patent: Aug. 11, 2015

(54) EXHAUST SYSTEM THERMAL ENCLOSURE

(71) Applicant: Caterpillar Inc., Peoria, IL (US)

(72) Inventors: Jack Albert Merchant, Peoria, IL (US); Paul F. Olsen, Chillicothe, IL (US); Eric J. Charles, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/842,390

(22) Filed: Mar. 15, 2013

(65) Prior Publication Data

US 2013/0213015 A1     Aug. 22, 2013

Related U.S. Application Data

(62) Division of application No. 12/320,426, filed on Jan. 26, 2009.

(51) Int. Cl.
| | |
|---|---|
| *F01N 3/00* | (2006.01) |
| *F01N 3/10* | (2006.01) |
| *F01N 3/025* | (2006.01) |
| *F01N 3/035* | (2006.01) |
| *F01N 3/20* | (2006.01) |
| *F01N 13/10* | (2010.01) |
| *F01N 13/14* | (2010.01) |

(52) U.S. Cl.
CPC ........ *F01N 3/10* (2013.01); *F01N 3/025* (2013.01); *F01N 3/035* (2013.01); *F01N 3/2066* (2013.01); *F01N 13/102* (2013.01); *F01N 13/14* (2013.01); *Y02T 10/24* (2013.01)

(58) Field of Classification Search
USPC .................................................. 60/274–324
See application file for complete search history.

(56) References Cited

U.S. PATENT DOCUMENTS

| | | | |
|---|---|---|---|
| 3,706,535 A * | 12/1972 | Taylor et al. ................... | 422/105 |
| 3,935,705 A * | 2/1976 | Hergoualch .................... | 60/302 |
| 4,086,976 A | 5/1978 | Holm et al. | |
| 4,264,344 A | 4/1981 | Ludecke et al. | |
| 4,349,078 A * | 9/1982 | Shimada et al. ............. | 180/69.1 |
| 4,419,113 A | 12/1983 | Smith | |
| 4,502,278 A | 3/1985 | Stark | |
| 4,548,164 A * | 10/1985 | Ylonen et al. ..................... | 123/2 |
| 4,571,938 A | 2/1986 | Sakurai | |
| 4,573,317 A | 3/1986 | Ludecke | |
| 4,651,524 A | 3/1987 | Brighton | |
| 4,987,738 A | 1/1991 | Lopez-Crevillen et al. | |
| 5,243,819 A | 9/1993 | Woerner et al. | |
| 5,572,866 A * | 11/1996 | Loving ............................ | 60/274 |
| 5,865,618 A | 2/1999 | Hiebert | |
| 6,543,562 B1 * | 4/2003 | Repko et al. ................. | 180/68.1 |
| 6,729,127 B2 | 5/2004 | Woerner et al. | |
| 6,834,634 B2 * | 12/2004 | Lawrence ................. | 123/195 C |
| 6,938,614 B2 | 9/2005 | Criddle et al. | |
| 6,983,728 B1 | 1/2006 | Banks, Jr. et al. | |
| 6,990,804 B2 | 1/2006 | Jacob et al. | |
| 7,025,810 B2 * | 4/2006 | Crawley et al. ................. | 95/278 |

(Continued)

*Primary Examiner* — Jesse Bogue
(74) *Attorney, Agent, or Firm* — Finnegan, Henderson, Farabow, Garrett & Dunner, LLP

(57) ABSTRACT

An exhaust system for a power system contained in an engine compartment. The exhaust system includes a mount for two or more exhaust treatment devices and an enclosure surrounding the two or more exhaust treatment devices. The enclosure defines a space with a higher temperature than a space defined by the engine compartment during steady state operation of the power system. At least one electronic or fluid device is coupled to the enclosure or mount and located on an exterior of the enclosure.

22 Claims, 5 Drawing Sheets

(56) References Cited

U.S. PATENT DOCUMENTS

| | | |
|---|---|---|
| 7,127,884 B2 * | 10/2006 | Worner et al. .................. 60/299 |
| 7,193,333 B1 * | 3/2007 | Kitch ............................ 290/1 A |
| 7,273,592 B2 | 9/2007 | Jacob et al. |
| 7,779,624 B2 | 8/2010 | Belisle et al. |
| 7,849,680 B2 * | 12/2010 | Shaff et al. ..................... 60/295 |
| 7,861,822 B2 | 1/2011 | Redmann |
| 8,191,668 B2 | 6/2012 | Keane et al. |
| 8,201,398 B2 * | 6/2012 | Boeckenhoff .................. 60/301 |
| 8,707,687 B2 * | 4/2014 | Aneja et al. ..................... 60/295 |
| 2003/0221424 A1 * | 12/2003 | Woerner et al. ................ 60/297 |
| 2004/0169374 A1 | 9/2004 | Wurtele et al. |
| 2005/0048348 A1 * | 3/2005 | Bazzarella ...................... 429/34 |
| 2005/0056008 A1 | 3/2005 | Endo |
| 2006/0266022 A1 * | 11/2006 | Woerner et al. ................. 60/295 |
| 2007/0144126 A1 | 6/2007 | Ohya et al. |
| 2008/0060351 A1 | 3/2008 | Pawson et al. |
| 2008/0121451 A1 * | 5/2008 | Kertz et al. ................ 180/69.24 |
| 2008/0173007 A1 | 7/2008 | Imes |
| 2008/0314033 A1 * | 12/2008 | Aneja et al. ..................... 60/297 |
| 2009/0293452 A1 | 12/2009 | Tarabulski |
| 2009/0313979 A1 | 12/2009 | Kowada |
| 2010/0095660 A1 * | 4/2010 | Oliver et al. |
| 2010/0112878 A1 | 5/2010 | White et al. |
| 2011/0023452 A1 | 2/2011 | Gisslen et al. |
| 2011/0030353 A1 | 2/2011 | Kamiya et al. |

* cited by examiner

EXHAUST SYSTEM THERMAL ENCLOSURE

This is a divisional of U.S. application Ser. No. 12/320,426, filed Jan. 26, 2009 and entitled "EXHAUST SYSTEM THERMAL ENCLOSURE" (PENDING), the entire disclosure of which is incorporated herein by reference.

TECHNICAL FIELD

The present disclosure relates generally to an enclosure for emissions system components and, more particularly, to a thermally insulating enclosure.

BACKGROUND

Conventional power systems for engines, factories, and power plants produce emissions that contain a variety of pollutants. These pollutants may include, for example, particulate matter (e.g., soot), nitrogen oxides (NOx), and sulfur compounds. Due to heightened environmental concerns, engine exhaust emission standards have become increasingly stringent. In order to comply with emission standards, machine manufactures have developed and implemented a variety of exhaust treatment components to reduce pollutants in exhaust gas prior to the exhaust gas being released into the atmosphere.

The exhaust treatment components may include, for example, a diesel particulate filter, a selective catalytic reduction device, a diesel oxidation catalyst, a heat source for regeneration of the diesel particulate filter, a muffler, and other similar components. Packaging of these exhaust treatment components is difficult and is often particularly difficult given the temperatures or heat involved. The devises and environment surrounding these exhaust treatment components may not be able to withstand this heat.

U.S. Pat. No. 7,127,884 (the '884 patent) describes multiple catalytic converter elements in a housing. The housing includes a jacket with a double wall.

SUMMARY

In one aspect, the present disclosure provides an exhaust system for a power system contained in an engine compartment. The exhaust system includes a mount for two or more exhaust treatment devices and an enclosure surrounding the two or more exhaust treatment devices. In another aspect, the enclosure defines a space with a higher temperature than a space defined by the engine compartment during steady state operation of the power system. In yet another aspect, at least one electronic or fluid device is coupled to the enclosure or mount and located on an exterior of the enclosure.

Other features and aspects of this disclosure will be apparent from the following description and the accompanying drawings.

DETAILED DESCRIPTION

Figure 1:
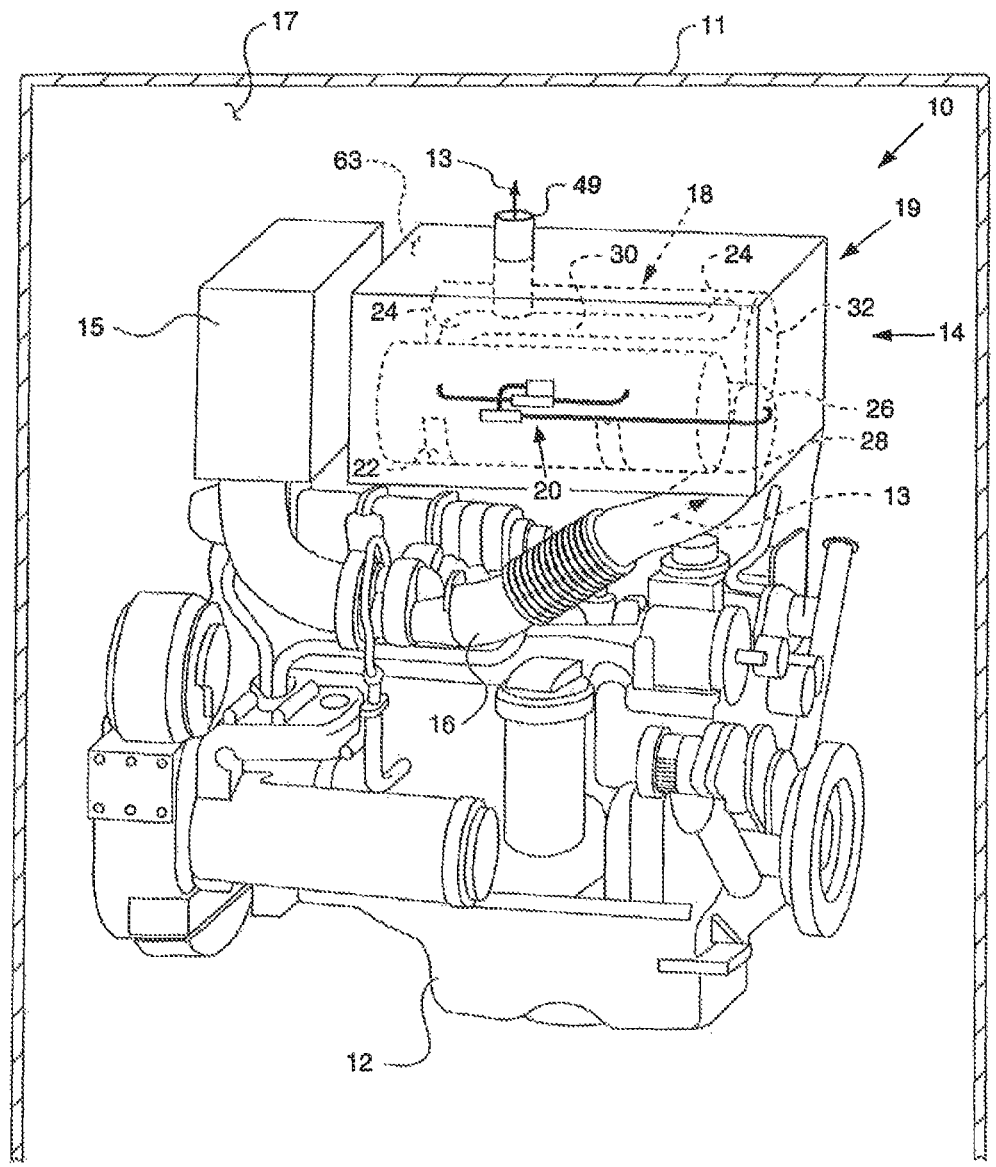
FIG. 1 is a diagrammatic view of a power system including an engine and an exhaust system in an enclosure.

As seen in FIG. 1, a power system 10 is contained inside an engine compartment 11. The power system 10 includes an engine 12 and an exhaust system 14 to treat an exhaust stream 13 produced by the engine 12. Engine 12 may receive air from an air cleaner 15. The exhaust stream 13 exits the engine 12 from an exhaust conduit 16 to enter the exhaust system 14. The engine 12 may include other features not shown, such as fuel systems, air systems, cooling systems, peripheries, drivetrain components, turbochargers, etc. The engine 12 may be any type of engine (internal combustion, gas, diesel, gaseous fuel, natural gas, propane, etc.), may be of any size, with any number of cylinders, and in any configuration ("V," in-line, radial, etc.). The engine 12 may be used to power any machine or other device, including on-highway trucks or vehicles, off-highway trucks or machines, earth moving equipment, generators, aerospace applications, locomotive applications, marine applications, pumps, stationary equipment, or other engine powered applications.

The engine compartment 11 is the portion of the machine or other device that contains the power system 10. The walls of the engine compartment 11 define a compartment interior space 17 inside, where the power system 10 is located. The engine compartment 11 may include the machine's hood and engine's enclosure. The engine compartment 11 may be open on one or more sides or may fully surround the power system 10. The engine compartment 11 may house additional components in addition to the power system 10. Portions of the power system 10 may also extend beyond the engine compartment 11. The engine compartment 11 may also have one or more radiators or other heat exchangers included in its walls or otherwise located in or outside the engine compartment 11.

Figure 2:
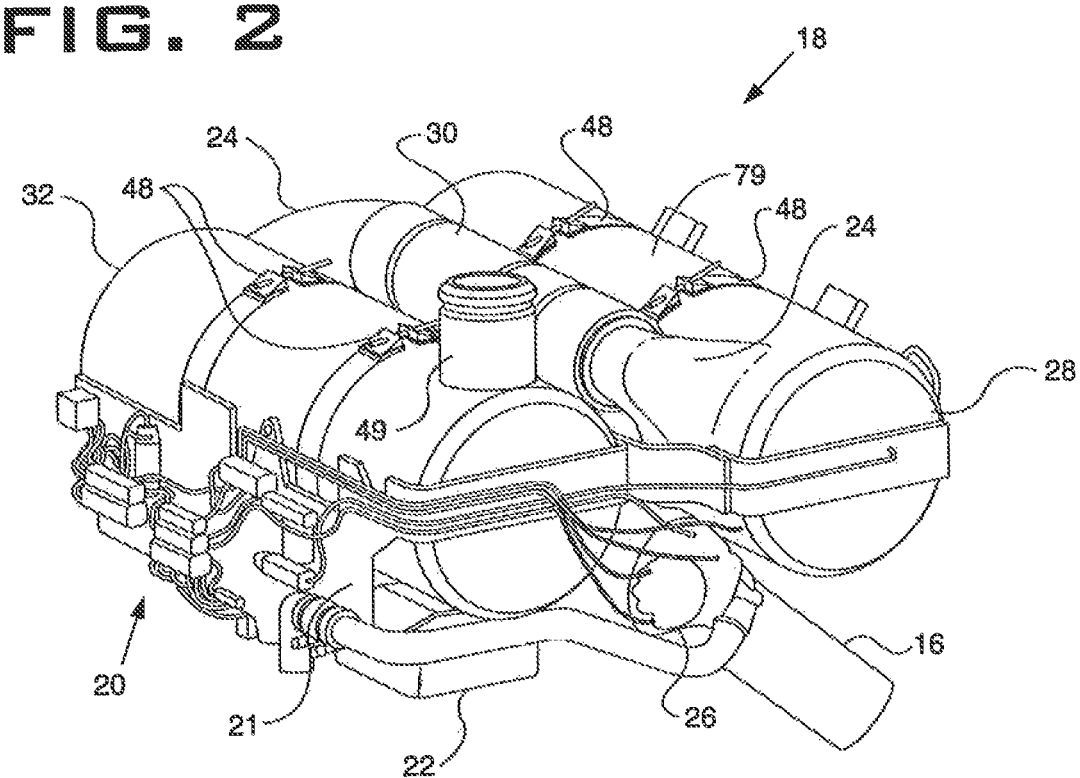
FIG. 2 is a diagrammatic view of a module with the exhaust treatment devices on a mount.

The exhaust system 14 includes an aftertreatment or component module 18 and enclosure 19. Seen best in FIG. 2, the module 18 may include electronics and fluids 20, plate 21, cradle or mount 22, conduits 24, and first, second, third, and fourth exhaust treatment devices 26, 28, 30, and 32. The module 18 may be designed to hold more or less than four exhaust treatment devices 26, 28, 30, and 32.

Exhaust treatment devices 26, 28, 30, and 32 may be devices configured to reduce emissions of harmful gasses, particulate matter, and/or noise emitted from engine 12. Each exhaust treatment device 26, 28, 30, and 32 may embody, for example, a diesel oxidation catalyst (DOC), a particulate filter (PF or DPF), a selective catalytic reduction (SCR) device, a lean NOx trap (LNT), a muffler, a DPF regeneration device, a reductant mixing device, connection tube, or any other exhaust treatment or handling device known in the art.

Electronics and fluids 20 may be configured to monitor and/or control operation of exhaust treatment devices 26, 28, 30, and 32. Electronics 20 may include one or more electronic devices, such as, for example, sensors, microprocessors, power supply circuitry, signal conditioning circuitry, actuator driving circuitry, and/or other types of electronics and circuitry known in the art. For example, electronics 20 may include a microprocessor and other data processing hardware configured to control injection of a reductant into one of exhaust treatment devices 26, 28, 30, and 32 (e.g., reductant for SCR or LNT). Electronics 20 may also include a microprocessor and other data processing hardware configured to control a regeneration process for one of exhaust treatment devices 26, 28, 30, and 32 (e.g., regeneration of DPF). Fluids 20 may include combustion air, fuel, reductant or other fluid used by the exhaust treatment devices 26, 28, 30, and 32.

At least a portion of the electronics and fluids 20 may be installed on the plate 21. The plate 21 may be positioned outside or inside the enclosure 19. Portions of the electronics and fluids 20 may also be located inside or outside the enclosure 19. The plate 21 may be coupled or mounted to the mount 22 or enclosure 19.

Figure 3:
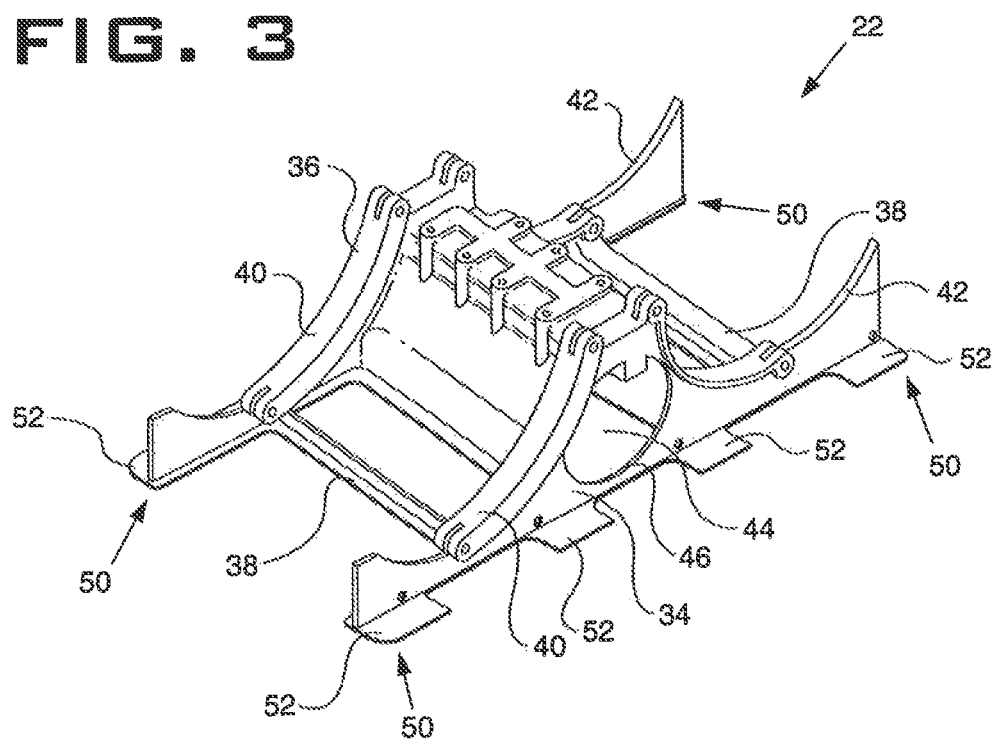
FIG. 3 is a diagrammatic view of the mount to receive the exhaust treatment devices.

As shown in FIG. 3, mount 22 is a device configured to support one or more exhaust treatment devices 26, 28, 30, and 32. Specifically, mount 22 may be configured to secure exhaust treatment devices 26, 28, 30, and 32 in a compact configuration. Mount 22 may be designed to locate exhaust treatment devices 26, 28, 30, and 32 in a parallel orientation relative to each other.

Mount 22 may include a first bracket 34 and a second bracket 36. First bracket 34 and second bracket 36 may be oriented parallel but spaced apart from each other. First bracket 34 may be coupled to second bracket 36 using one or more rigid cross members 38. Cross members 38 may attach to first and second brackets 34 and 36 via mechanical fasteners (e.g., bolts, screws, rivets, etc.), welding, brazing, or any other joining process known in the art. Alternatively, first bracket 34, second bracket 36, and cross members 38 may be formed as a single casting.

Each of first and second brackets 34 and 36 may include a first support surface 40. First support surface 40 of first bracket 34 and first support surface 40 of second bracket 36 may be configured to support each end of fourth exhaust treatment device 32. Each of first and second brackets 34 and 36 may also include a second support surface 42. Second support surface 42 of first bracket 34 and second support surface 42 of second bracket 36 may be configured to support each end of second exhaust treatment device 28. In addition to connecting first and second brackets 34 and 36, one or more of cross members 38 may be configured to support a middle portion of fourth exhaust treatment device 32 and/or second exhaust treatment device 28.

It is contemplated that a geometry of first support surface 40 may be shaped to match an outer geometry of fourth exhaust treatment device 32 and a geometry of second support surface 42 may be shaped to match an outer geometry of second exhaust treatment device 28. For example, when fourth and second exhaust treatment devices 32 and 28 are shaped as canisters, first and second support surfaces 40 and 42 may have generally arcuate surfaces with substantially the same radii of curvature as fourth and second exhaust treatment devices 32 and 28, respectively.

Mount 22 may also include an aperture 44 in first bracket 34 and second bracket 36. Aperture 44 may define a third support surface 46. Third support surface 46 of apertures 44 may be configured to support, for example, each end of first exhaust treatment device 26. Exhaust treatment devices 26, 28, 30, or 32 may be secured to the mount 22 via clamps, bolts, welding, or bands 48. The exhaust treatment devices 26, 28, 30, and 32 may be fluidly coupled together via conduits 24. The exhaust stream 13 exits the module 18 through exit conduit 49.

In the current exemplary embodiment, the second exhaust treatment device 28 may embody a DPF and the first exhaust treatment device 26 may embody a regeneration device for the DPF. This regeneration device may include a fuel fired burner or other heat source. The second exhaust treatment device 28 may also embody a DOC, possibly in addition to the DPF. The third exhaust treatment device 30 may embody a connection tube and the fourth exhaust treatment device 32 may embody a muffler. The fourth exhaust treatment device 32 may also embody an SCR device, and reductant may be injected and mixed in third exhaust treatment device 30.

Mount 22 may include a base portion 50 with one or more mounting footings 52. Each footing 52 may be configured to mount to the engine 12 or machine.

The enclosure 19 provides a degree of thermal isolation from the surrounding environment, devices, and electronics and fluids 20. The enclosure 19 may be designed to minimize ventilation to achieve near total encapsulation. In one embodiment, however, vents 53 may be added to provide ventilation as needed for heat dissipation if the temperature inside the enclosure 19 would reach a limit.

The enclosure 19 may include a front 54, a back 56, a top 58, a bottom 60, a first side 61, and a second side 62 to form a box structure. The enclosure 19 defines an enclosure interior space 63 inside, where the module 18 is located.

The exit conduit 49 may exit the enclosure 19 through an exit opening 64. The exit opening 64 may be located in the top 58 of the enclosure 19 or elsewhere as needed to route the exhaust stream 13 to the atmosphere. The exhaust conduit 16 may enter the enclosure 19 through an entrance opening 66. The entrance opening 66 may be located in the bottom 60 of the enclosure 19 or elsewhere as needed to route the exhaust stream 13 to the first exhaust treatment device 26.

Figure 4:
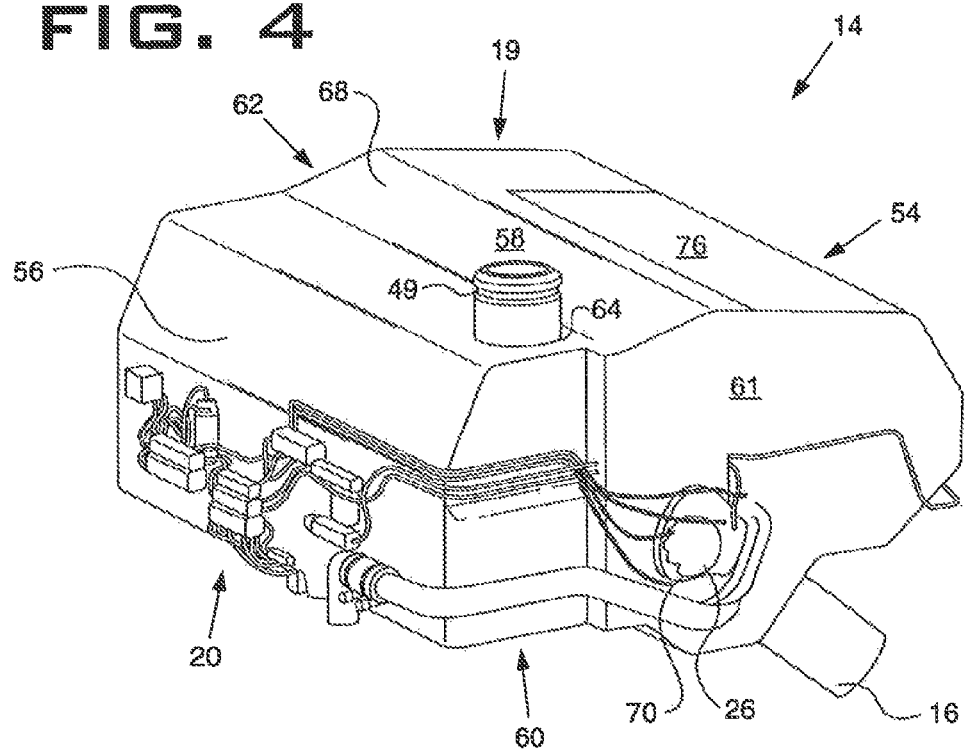
FIG. 4 is a diagrammatic view of the module in the enclosure.
Figure 5:
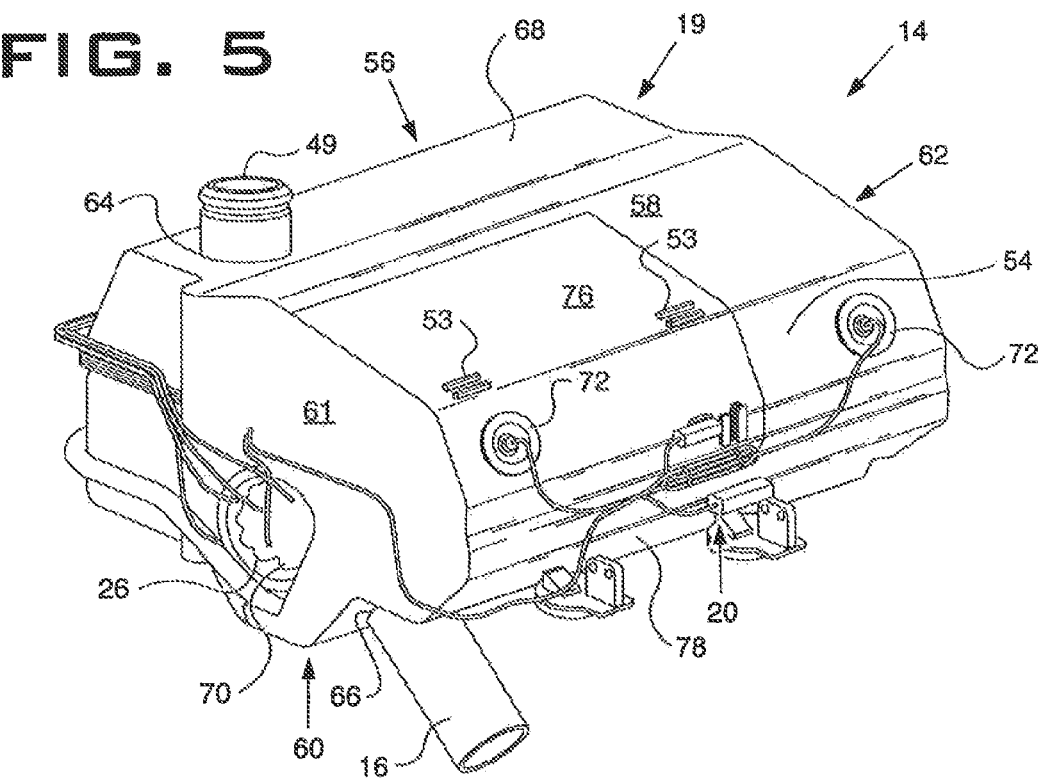
FIG. 5 is a diagrammatic view of the enclosure from FIG. 4 rotated.

As seen in FIGS. 4 and 5, the electronics and fluids 20 may be mounted or at least partially located on an outside or exterior 68 of the enclosure 19. The electronics and fluids 20 may also be routed to run along the exterior 68. A head portion 70 of the first exhaust treatment device 26 may be exposed by the enclosure 19. The electronics and fluids 20 required for the first exhaust treatment device 26 may connect at this exposed head portion 70, thereby avoiding the heat inside the enclosure 19.

The electronics and fluids 20 may also enter the enclosure 19 through ports 72 or other openings. These electronics and fluids 20 may be used for sensing or introducing reductants. If included, the plate 21 may also be outside the enclosure 19 and may be coupled to the mount 22.

Figure 6:
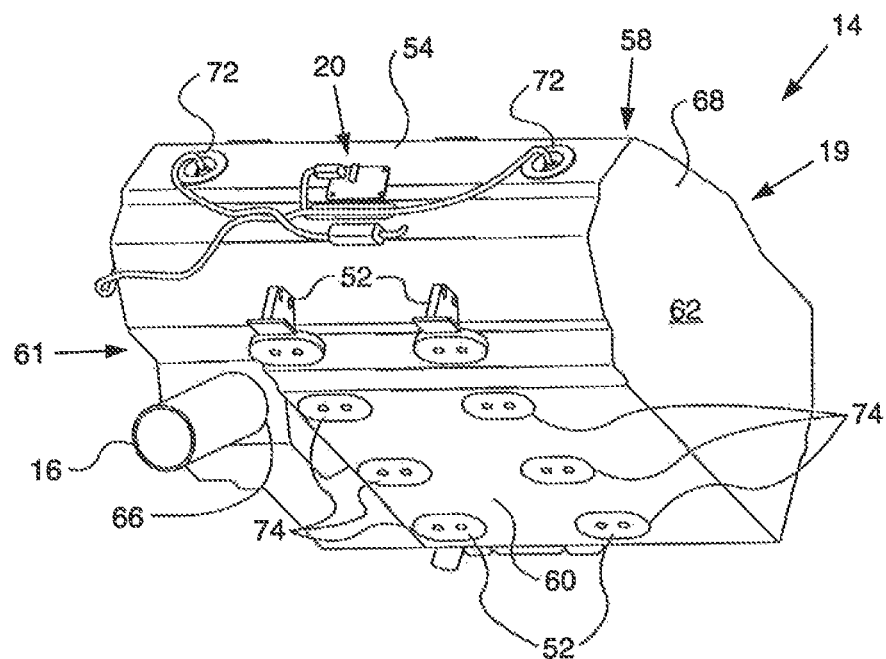
FIG. 6 is a diagrammatic view of the bottom of the enclosure from FIG. 4.

FIG. 6 shows the enclosure 19 may include mount openings 74. The mount openings 74 expose the footings 52 or another part of the base portion 50, providing access for the exhaust system 14 to be mounted.

Figure 7:
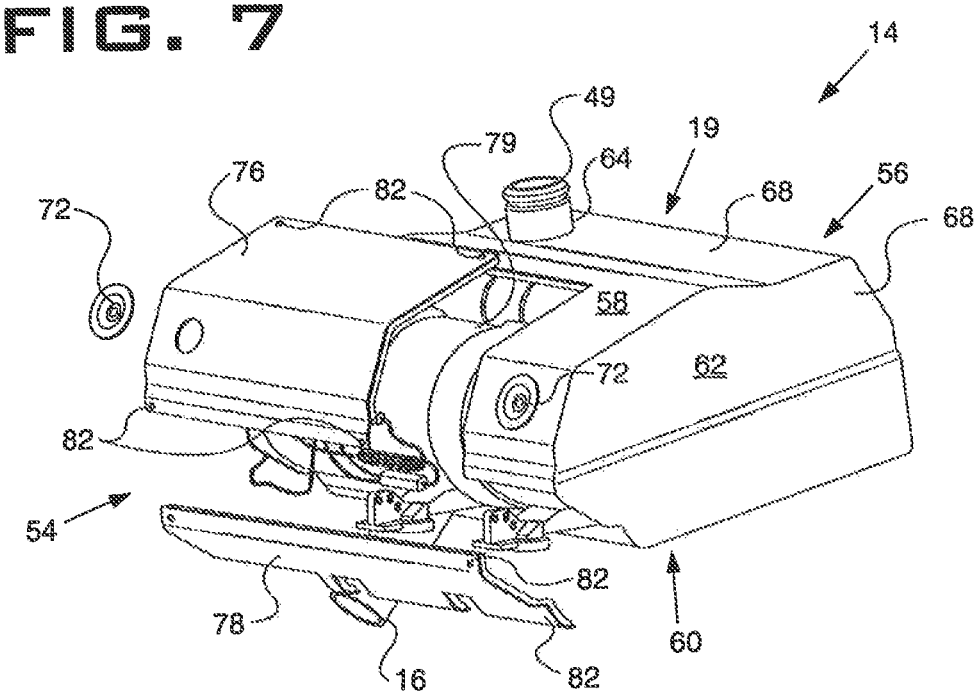
FIG. 7 is a diagrammatic view of the enclosure from FIG. 4 with a top front panel, bottom front panel, and plug removed.

Portions or panels of the enclosure 19 may be removable to allow servicing of the module 18 and exhaust treatment devices 26, 28, 30, and 32. FIG. 7 shows a removable front top panel 76 and bottom front panel 78 to be removable from the other parts of the enclosure 19. In one embodiment, the front top panel 76 and bottom front panel 78 are located to provide access to a DPF portion 79 of the second exhaust treatment device 28. The DPF may have to be periodically removed for service. The front top panel 76 and bottom front panel 78 may provide access to the DPF or second exhaust treatment device 28. The DPF portion 79 may be located between bands 48 so that the DPF portion is removable from the second exhaust treatment device 28 for service.

Figure 8:
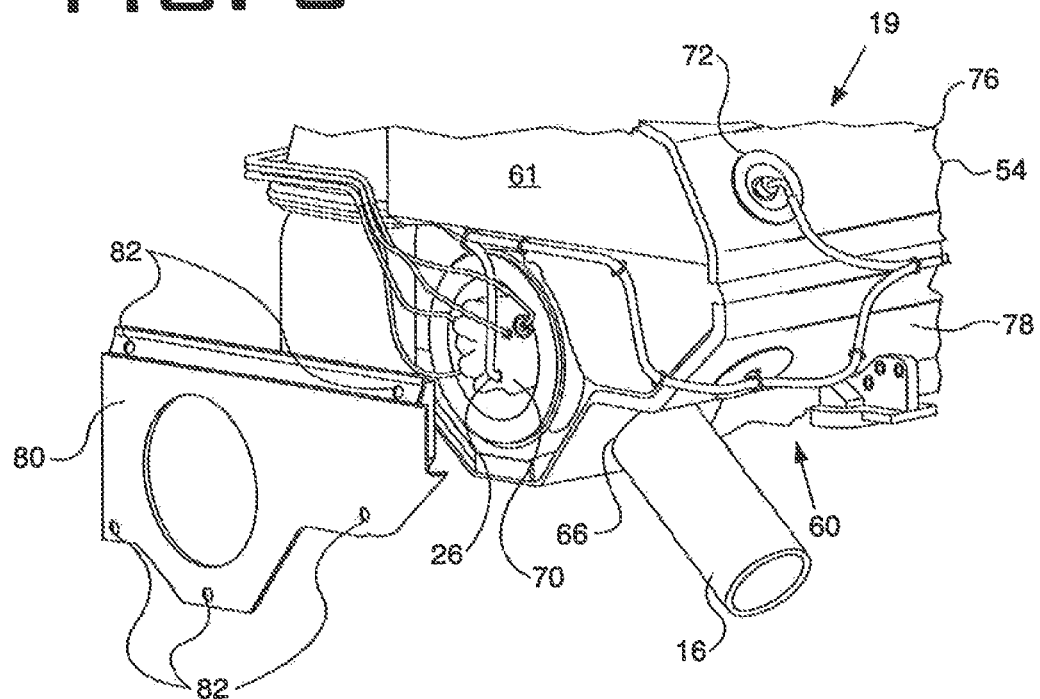
FIG. 8 is a diagrammatic view of a side of the enclosure from FIG. 4 with a side panel removed.

FIG. 7 also shows ports 72 may be removable. FIG. 8 shows a side panel 80 may also be removable to provide access to the regeneration device or first exhaust treatment device 26 and its associated electronics and fluids 20. Other portions of the enclosure 19 may be removable as needed for assembly and service. Any portion of the front 54, back 56, top 58, bottom 60, first side 61, or second side 62 may be removable.

The removable panels may be held in place with fasteners 82. The fasteners 82 may be bolts, 90 degree quick turn latches, clips, or other fastening device. The removable panels may rest on over hanging portions of the surrounding portions of the enclosure 19. Support tabs may also be added for the removable panels to rest on and prevent from falling into the enclosure 19.

Because access to the enclosure 19 may be limited in the machine, the removable panels may be designed so that they can be removed from a given direction for accessibility. Additionally, the fasteners 82 may be located so that they can be accessed from a given direction. This given direction may provide access from the top, bottom, front, back, or side. In one embodiment, for example, the front top panel 76 and bottom front panel 78 are removable and assessable from the front without access needed from the top.

Figure 9:
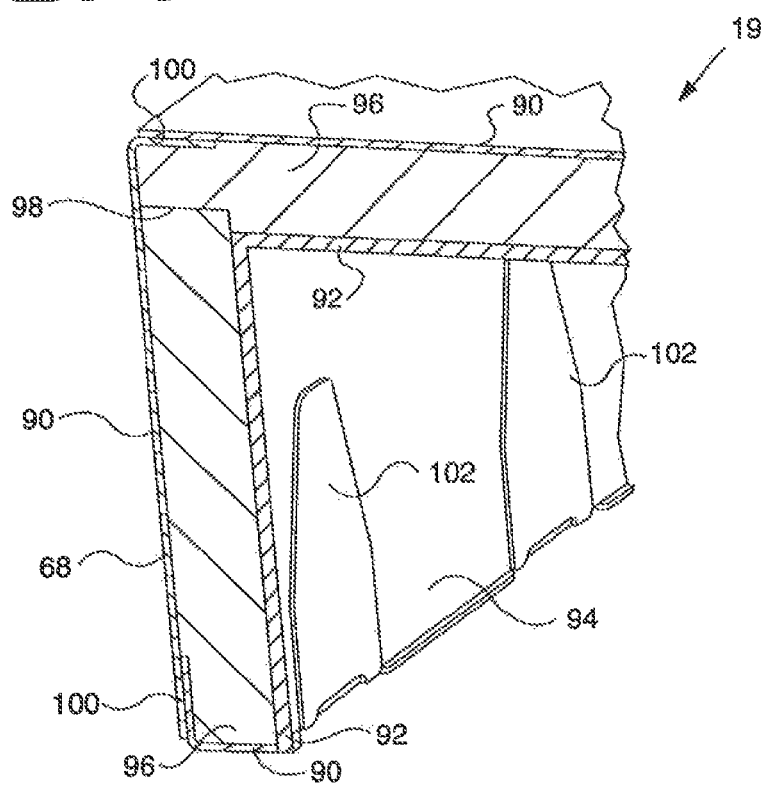
FIG. 9 is a cross-sectional view of the enclosure.

FIG. 9 illustrates how the enclosure 19 may be constructed. An outer shell 90 may form the exterior 68, an inner shell 92 may form an interior 94. An insulation 96 may be between the outer shell 90 and inner shell 92. An alternative embodiment may not include an outer shell 90 or inner shell 92 depending on the durability of the insulation 96. The front 54, back 56, top 58, bottom 60, first side 61, or second side 62 may overlap at overlapping regions 98 to form the enclosure 19 structure.

The outer shell 90 and inner shell 92 may be a material of composition and size to withstand the temperature and stress involved. In one embodiment, the outer shell 90 may be aluminized steel, sheet metal, or 321 or 316 corrosion resistant steel (CRS) and may be roughly 1.5 mm thick. The inner shell 92 may be a glass silica fiber or high efficiency paper based material and may have adhesive and may be roughly 12 mm thick and also serve as the insulation 96.

The front 54, back 56, top 58, bottom 60, first side 61, or second side 62 outer shells 90 may also include overlapping outer shell regions 100 to form the enclosure 19 structure. The outer shell 90 may also include containment clips 102. The containment clips 102 may extend or fold over from the edge of the outer shell 90 and over the interior 94 to hold the inner shell 92 or insulation 96 in place. Alternative embodiments may include fasteners to hold the outer shell 90, inner shell 92, and insulation 96 in place.

The spacing between the enclosure 19 and module 18 may be designed to avoid direct contact while limited for packing in the machine. In one embodiment, the enclosure 19 is spaced roughly 1 inch from the module 18. In other embodiments, the enclosure 19 may be in contact with the module 18 or spaced apart from the module 18 at a greater distance. The contour, shape, and size of enclosure 19 and module 18 may be designed to achieve the desired spacing.

INDUSTRIAL APPLICABILITY

Achieving a limited enclosure 19 exterior 68 temperature may be desired in certain machine application. For example, many machine applications are exposed to a variety of combustibles. Other machine applications may involve personnel near the power system 10.

The design of the enclosure 19 is developed to achieve a given exterior 68 or skin temperature as required by the machine application during normal operation conditions of the power system 10. In one embodiment, the design may be sufficient to achieve an exterior 68 temperature of roughly 200 degrees Celsius. This exterior 68 temperature may be achievable with a temperature of the exhaust stream 13 at the exit conduit 49 of roughly 550 degrees Celsius and a temperature surrounding the enclosure of 80 degrees Celsius.

The enclosure 19 insulates the module 18 from its surroundings. As such, during steady state operation of the power system 10, the temperature in the enclosure interior space 63 is higher than the temperature in the compartment interior space 17. Accordingly, the enclosure 19 protects the components located outside or exterior to the enclosure 19 from thermal damage. The limited exterior 68 temperatures and enclosure interior space 63 temperatures provided by the enclosure 19 may specifically protect the electronics and fluids 20.

The steady state operation of the power system 10 may be considered the time when the temperature in the enclosure interior space 63 and compartment interior space 17 both reach a substantially maximum and constant temperature. The enclosure 19 may also acoustically insulate the module 18 from its surroundings.

Although the embodiments of this disclosure as described herein may be incorporated without departing from the scope of the following claims, it will be apparent to those skilled in the art that various modifications and variations can be made. Other embodiments will be apparent to those skilled in the art from consideration of the specification and practice of the disclosure. It is intended that the specification and examples be considered as exemplary only, with a true scope being indicated by the following claims and their equivalents.

What is claimed is:

1. A portion of an exhaust system for a power system contained in an engine compartment, comprising:
    an exhaust treatment module including two or more exhaust treatment devices, one of the exhaust treatment devices including a fuel fired burner, and a module housing arrangement conveying exhaust from an inlet of the module to an outlet of the module;
    an enclosure surrounding the exhaust treatment module, the enclosure being located in the engine compartment and forming an air gap between the module housing arrangement and the enclosure, the enclosure having an outer shell, an inner shell, and an insulation between the inner shell and the outer shell; and
    an electronic device coupled to an exterior of the enclosure, wherein exhaust is only in fluid communication with the exhaust treatment module in the portion of the exhaust system, and
    wherein the enclosure has at least one gap such that a portion of the exhaust treatment module is exposed to the exterior of the enclosure.

2. The exhaust system of claim 1, wherein the electronic device connects to one of the two or more exhaust treatment devices.

3. The exhaust system of claim 1, wherein one of the two or more exhaust treatment devices includes a diesel particulate filter.

4. The exhaust system portion of claim 1, wherein the enclosure includes at least one removable panel to provide access to at least one of the two or more exhaust treatment devices.

5. The exhaust system portion of claim 1, further including a mount that supports the two or more exhaust treatment devices.

6. The exhaust system portion of claim 1, further including a fluid device coupled to the exterior of the enclosure.

7. The exhaust system portion of claim 1, wherein the mount includes a first bracket and a second bracket.

8. The exhaust system portion of claim 7, wherein the first and second brackets are substantially parallel to each other.

9. The exhaust system portion of claim 1, wherein the at least one gap is configured to allow the electronic device to connect to one of the two or more exhaust treatment devices.

10. The exhaust system portion of claim 5, wherein the at least one gap is configured to allow the mount to support the two or more exhaust treatment devices.

11. A portion of an exhaust system for a power system contained in an engine compartment, comprising:
- an exhaust treatment module including two or more exhaust treatment devices and a module housing arrangement having a module exhaust inlet conduit and a module exhaust outlet conduit; and
- an enclosure surrounding the exhaust treatment module, the enclosure
  - being located in the engine compartment adjacent an engine of the power system,
  - forming an air gap between the module housing arrangement and the enclosure,
  - including a first opening surrounding the module exhaust inlet conduit, and a second opening surrounding the module exhaust outlet conduit, and
  - including an outer shell, an inner shell, and an insulation between the inner shell and the outer shell; and
- an electronic device coupled an exterior of the enclosure,
- wherein exhaust is only in fluid communication with the exhaust treatment module in the portion of the exhaust system, and
- wherein the enclosure has at least one gap such that a portion of the exhaust treatment module is exposed to the exterior of the enclosure.

12. The exhaust system portion of claim 11, wherein the enclosure includes at least one removable panel to provide access to at least one of the two or more exhaust treatment devices.

13. The exhaust system portion of claim 12, wherein the enclosure includes at least a front, a back, a top, a bottom, a first side, and a second side to form a box structure.

14. The exhaust system portion of claim 13, wherein one of the exhaust treatment devices includes a diesel particulate filter and one of the exhaust treatment devices includes a fuel fired burner.

15. The exhaust system portion of claim 14, wherein the exhaust treatment module further includes a diesel oxidation catalyst (DOC).

16. The exhaust system portion of claim 11, further including a fluid device coupled to the exterior of the enclosure.

17. The exhaust system portion of claim 11, wherein the mount includes a first bracket and a second bracket.

18. The exhaust system portion of claim 17, wherein the first and second brackets are substantially parallel to each other.

19. A portion of an exhaust system for a power system contained in an engine compartment, comprising:
- an exhaust treatment module including two or more exhaust treatment devices and a module housing arrangement conveying exhaust from an inlet of the module to an outlet of the module;
- an enclosure surrounding the exhaust treatment module, the enclosure being located in the engine compartment and forming an air gap between the module housing arrangement and the enclosure;
- an electronic device coupled to an exterior of the enclosure; and
- a fluid device coupled to the exterior of the enclosure,
- wherein exhaust is only in fluid communication with the exhaust treatment module in the portion of the exhaust system, and
- wherein the enclosure has at least one gap such that a portion of the exhaust treatment module is exposed to the exterior of the enclosure.

20. The exhaust system portion of claim 19, wherein the electronic device or the fluid device connects to one of the two or more exhaust treatment devices.

21. The exhaust system portion of claim 19, wherein the mount includes a first bracket and a second bracket.

22. The exhaust system portion of claim 21, wherein the first and second brackets are substantially parallel to each other.

* * * * *